Sept. 13, 1960
H. FRIESS
MAGNETOGRAM SYSTEM AND APPARATUS FOR PICTURE AND SOUND RECORDING
Filed June 12, 1957
2,952,737
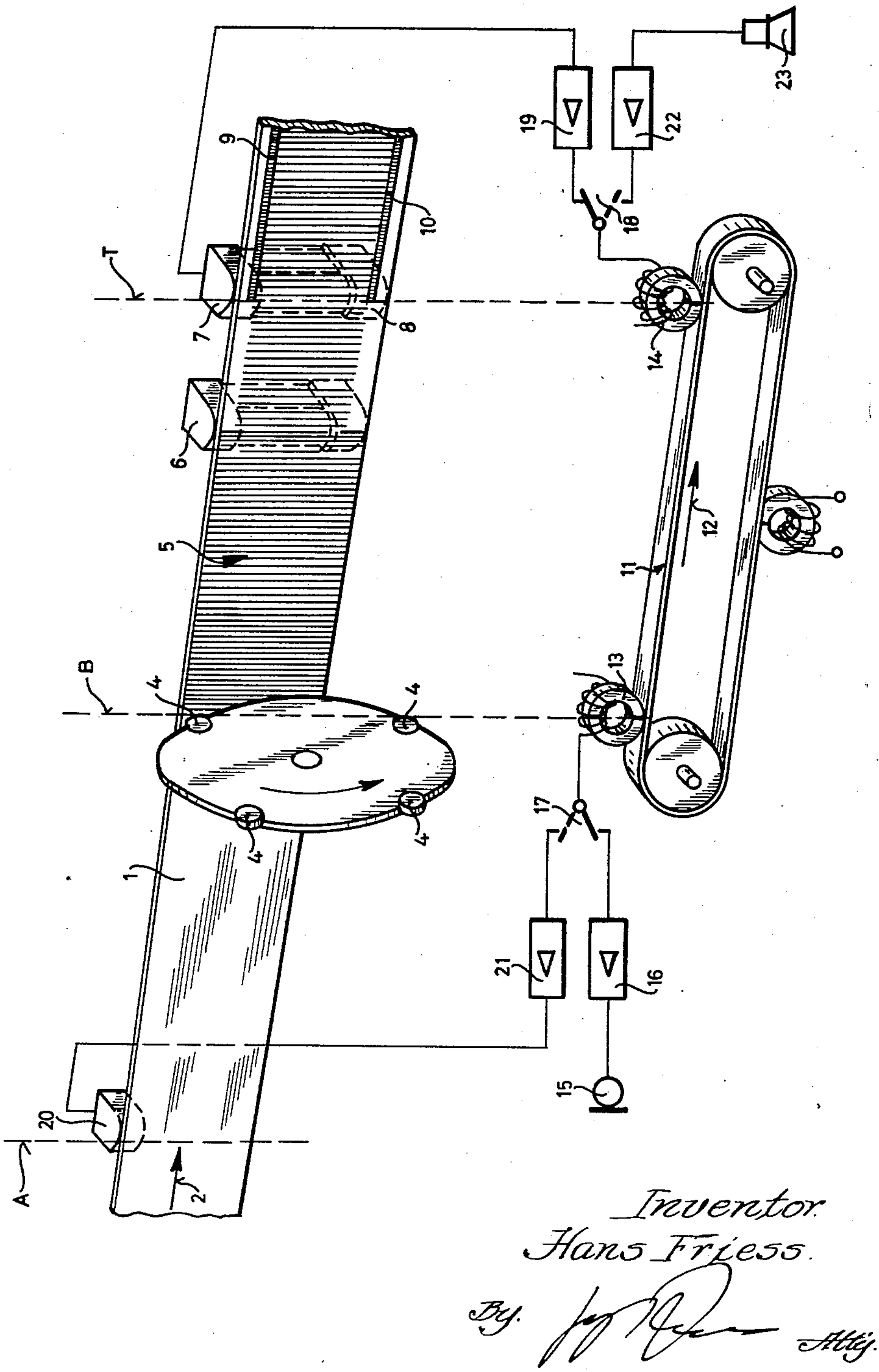
Inventor
Hans Friess
By [signature] Atty.

United States Patent Office 2,952,737

Patented Sept. 13, 1960

2,952,737

MAGNETOGRAM SYSTEM AND APPARATUS FOR PICTURE AND SOUND RECORDING

Hans Friess, Karlsruhe-Daxlanden, Germany, assignor to Siemens and Halske Aktiengesellschaft Berlin and Munich, a corporation of Germany Filed June 12, 1957, Ser. No. 665,333

Claims priority, application Germany Apr. 16, 1957

12 Claims. (Cl. 178—5.6)

This invention is concerned with a magnetogram system and apparatus for picture and sound recording.

In systems of this type, the point of sound recording is usually displaced with respect to the point of picture recording so that the picture and sound are recorded one displaced relative to the other. During reproducing, the sound scanning may be displaced with respect to the picture scanning so that picture and sound events belonging together can be reproduced simultaneously. However, the displacement of the picture and sound records affects the processing and especially the cutting of the corresponding magnetogram film or tape detrimentally.

The invention provides a method of and apparatus for overcoming this drawback.

The invention provides primarily for equalizing the displacement of picture and sound recording by corresponding delay in the sound recording. This delay is suitably effective directly incident to the recording operation. The sound recording currents are thereby delayed in such a manner that the picture and sound records appear upon the magnetogram carrier without displacement, one next to the other, despite the displacement of the corresponding recording points. The picture and sound belonging together accordingly occupy upon the film or tape correlated positions, and the cutting can be effected without any detrimental effects.

In order to effect the delay for the equalization of the displacement, there is suitably also used the magnetogram system, employing a magnetogram carrier, and record and reproduce heads, respectively, which are displaced with respect to each other in accordance with the corresponding displacement of picture and sound recording on the principal magnetogram carrier. An endless magnetogram tape, known as such, may be used for effecting the delay. Assuming that this tape moves with the same speed as the principal magnetogram carrier, the magnetic heads cooperating therewith will be displaced with respect thereto by an amount corresponding to the displacement of the picture and sound recording points cooperating with the principal magnetogram carrier.

A picture-sound magnetogram carrier carrying recordings according to the invention would upon reproduction necessitate picture and sound scanning at the same place. However, the arrangement of the scanning heads, for this purpose, at the same tape point is for reasons of space, just as in the recording, usually impossible. It is accordingly necessary to operate in the reproducing apparatus likewise with displacement of the picture and sound scanning places. This would again result in displacement of the sound reproduction with respect to the picture reproduction.

In accordance with the invention, this last noted drawback is likewise overcome by corresponding delays; the sound scanning place is for this purpose disposed with respect to the picture scanning place at the other side of the sound recording point, such arrangement making it possible to use for the delay without any changes the same delay apparatus as is used for effecting the recording delay. Suitable switching means are employed for quickly switching the delay device from recording to reproduction.

The various objects and features of the invention will appear from the description which will be rendered below with reference to the accompanying drawing showing in schematic manner an example thereof. The illustrated device is adapted for recording and also for reproduction.

Referring now to the drawing, numeral 1 indicates a carrier in the form of a tape or film moving in the direction of the arrow 2. The carrier 1 is in usual known manner guided by means of guide and transport means including guide and drive rollers, such known means having been omitted from the drawing to keep it simple.

The recording of the picture of a television modulation, delivered by a television camera (not shown) is effected at the picture recording point or place B by means of a magnetic head arrangement 3 which rotates in a plane extending perpendicular to the magnetogram carrier 1, the head arrangement 3 carrying magnetic heads 4 which record the picture modulation along transverse lines 5 of the carrier 1.

Following the picture recording point B is the erase head 6 for erasing picture recordings 5 along narrow margins of the magnetogram carrier 1. Following the erase head 6, along the sound recording point T, is the sound recording head 7, which is in engagement with one margin of the carrier 1 and having a signal recording head 8 cooperating with the other margin of the carrier. The sound recording head 7 records the sound along the marginal track 9 and the signal recording head 8 records along the marginal track 10 synchronizing signals belonging to the picture recording. The picture and sound recordings are upon the magnetogram carrier displaced by the amount B–T which has in practical operation a length, for example, of 15 cm.

In order to equalize the explained displacement, the invention proposes an endless magnetogram carrier 11 which is suitably moved, in the direction of the arrow 12, at the same speed as the magnetogram carrier 1; a recording head 13 and a reproduce head 14 cooperating with the endless carrier 11. An erase head is disposed on the side opposite the heads 13 and 14. The spacing between the heads 13 and 14 corresponds, assuming identical speeds of the carriers 1 and 11, to the spacing B and T between the picture and sound recording at the magnetogram carrier 1.

During the recording, the sound currents, originating, for example, at a microphone 15, are directed by way of an amplifier 16 and a switching device 17, to the recording head 13 and are thus recorded upon the endless magnetogram carrier 11. The reproduce head 14 scans the recording on the carrier 11 with a delay, and the sound currents are conducted by way of a switching device 18 and an amplifier 19 to the sound recording head 7 cooperating with the magnetogram carrier 1.

Due to the delay provided by the invention, the picture recording 5 and the sound recording 9 are recorded upon the magnetogram carrier 1 without any displacement. Accordingly, the magnetogram carrier can be processed and cut as may be desired. The picture signal along the track 10 which furnishes at the end of the picture a signal with a high amplitude peak, is suitably used as an aid in cutting. The corresponding point is found upon drawing the carrier 1 past the scanning head 8 and will indicate that the cutting has been effected exactly at the end of the picture.

For the reproduction, there is provided a sound scanning head 20 on the other side of the picture scanning point B, marginally of the magnetogram carrier 1, which is suitably displaced relative to the picture recording point B by the same amount as the sound recording point T is displaced with respect to the picture recording point B. The distances B–T and B–A are accordingly identical and their length is about 15 cm.

It will be seen from the foregoing explanations that the same delay device comprising the magnetogram carrier 11 may be used for the reproduction without any rearrangement of the heads 13 and 14.

The invention may also be used in cases where the distance A–B differs from the distance B–T provided that a delay device is used which operates with a correspondingly changed delay time, in other words, with the distance between the heads 13, 14 correspondingly changed.

The switching means 17 and 18 are for reproduction put into the dotted line positions. The sound currents will then be conducted from the sound scanning head 20 by way of an amplifier 21 and switch 17 to the recording head 13 and are after a predetermined delay picked up from the carrier 11 by the head 14, for transmission by way of the switch 18 and an amplifier 22 to a loudspeaker 23.

The invention makes it possible to displace incident to recording and reproduction the sound recording point T with respect to the picture recording or picture reproducing point B, which is of advantage for reasons of space, without resulting in any detrimental displacement of sound and picture on the magnetogram carrier.

The invention may be analogously used for replay or playback purposes.

Changes may be made within the scope and spirit of the appended claims.

I claim:

1. Magnetogram apparatus for recording picture and sound frequency magnetograms, comprising a movable principal magnetogram carrier, means disposed relative to said principal carrier at a first place for magnetically recording picture frequencies thereon, means disposed relative to said carrier at a second place which is displaced with respect to said first place in the direction of movement of said carrier for recording sound frequencies on said principal carrier, a delay device comprising a further movable magnetogram carrier, a record head and a reproduce head for cooperation with said further magnetogram carrier, said record head being arranged to record sound frequencies associated with the picture frequencies, said reproduce head being operatively connected to the sound frequency recording means disposed relative to said principal magnetogram, said record and reproduce heads being mutually displaced to effect a delay to compensate for the displacement of said sound and picture frequency recording means relative to said principal carrier.

2. Apparatus according to claim 1, wherein said delay effects spatially correlated picture and sound frequency recording on said principal carrier.

3. Apparatus according to claim 2, comprising an endless element constituting said further magnetogram carrier.

4. Apparatus according to claim 1, wherein said magnetogram carriers move at identical speed, said record and reproduce heads being mutually displaced by an amount corresponding to the amount of displacement of said picture and sound recording means relative to said principal carrier.

5. Apparatus according to claim 1, wherein said magnetogram carriers move at identical speed, sound frequency scanning means disposed for cooperation with said principal carrier at a point which is displaced with respect to the picture frequency scanning cooperating therewith, said record and reproduce heads being mutually displaced by an amount corresponding to the amount of displacement of said sound frequency and picture frequency scanning means cooperating with said principal carrier.

6. Apparatus according to claim 1, comprising sound pickup means cooperating with said principal carrier, and switching means for selectively connecting said delay device for recording or reproduction either with said sound frequency recording means or with said sound frequency pickup means.

7. Apparatus according to claim 6, comprising a rotating magnetic head device constituting respectively picture frequency recording and scanning means, said sound frequency recording means and said pickup means being respectively adapted to record and pick up sound frequencies along a marginal track on said principal carrier, and means for connecting said delay device selectively with said sound recording or with said sound pickup means.

8. In a magnetogram recording-reproducing system, a movable principal magnetogram carrier, picture frequency scanning means disposed for cooperation with said carrier for respectively impressing picture frequencies thereon or taking off picture frequencies therefrom, a sound frequency pickup head and a sound frequency record head disposed spaced from said scanning means respectively ahead thereof and in back thereof as seen in the direction of motion of said principal carrier, an auxiliary movable magnetogram carrier, a record and a reproduce head disposed for cooperation with said auxiliary carrier, said record and reproduce heads being mutually spaced by an amount corresponding to the spacing between said pickup head and said picture frequency scanning means and between the latter and said sound frequency record head, means for moving said carriers at the same speed, means for selectively connecting said record head cooperating with said auxiliary magnetogram carrier either with a sound source or with said pickup head, a sound reproducing device, and means for selectively connecting said record head cooperating with said auxiliary carrier with said sound frequency record head or with said sound reproducing device.

9. A system and cooperation of parts according to claim 8, wherein said magnetogram carriers move at substantially identical speeds.

10. A system and cooperation of parts according to claim 8, comprising an erase head disposed at a point intermediate said picture frequency scanning means and said sound frequency recording means for erasing picture frequency recordings marginally of said principal carrier, said sound frequency recording means being effective to impress respectively sound frequencies and synchronizing signals marginally along erased tracks of said principal carrier, said pickup head being effective to pick up sound frequencies from the corresponding track on said principal carrier.

11. In a magnetogram recording system, a movable principal magnetic tape, rotating magnetic head means for impressing on said principal tape picture frequencies, magnetic head means spaced from said rotating magnetic head means for impressing along a marginal track of said principal tape sound frequencies, an auxiliary movable magnetic tape, a record head and a pickup head disposed mutually spaced for cooperation with said auxiliary tape by an amount corresponding to the spacing between said rotating magnetic head means and said sound frequency recording means, means for moving said tapes at the same speed a sound source, means for connecting said sound source with said record head to record corresponding sound frequencies on said auxiliary carrier, and means for connecting said pickup head with said sound frequency recording head to conduct said sound frequencies thereto so as to energize said recording head to record said sound frequencies on said principal carrier.

12. In a magnetogram reproducing system, a movable principal magnetic tape carrying picture and sound frequencies recorded thereon, a sound frequency pickup head disposed for cooperation with said principal tape, a rotatable magnetic head device disposed for cooperation with said principal tape at a point spaced from said sound frequency pickup head in back of the latter as seen in the direction of motion of said principal tape, an auxiliary magnetic tape, a magnetic recording head and a magnetic reproduce head arranged for cooperation with said auxiliary tape mutually spaced by an amount corresponding substantially to the spacing between said rotatable head device and said sound frequency pickup head, a sound reproducer, means for moving said tapes at the same speed means for connecting said sound frequency pickup head with said record head to record sound frequencies on said auxiliary tape, and means for connecting said reproduce head with said sound reproducer to conduct to the latter sound frequencies picked up from said auxiliary tape.

References Cited in the file of this patent

UNITED STATES PATENTS

| | | |
|---|---|---|
| 2,629,827 | Eckert | Feb. 24, 1953 |
| 2,807,002 | Cherin | Sept. 17, 1957 |

OTHER REFERENCES

Tele-Tech and Electronic Industries, pages 72, 73, 108, and 110, August 1956.

Journal of the S.M.P.T.E., vol. 66, No. 4, April 1957, pages 177 to 188, inclusive.